United States Patent
Paripati (10) Patent No.: US 9,226,481 B1
(45) Date of Patent: Jan. 5, 2016

(54) ANIMAL WEIGHT MONITORING SYSTEM

(71) Applicant: Praveen Paripati, Reston, VA (US)

(72) Inventor: Praveen Paripati, Reston, VA (US)

(73) Assignee: Praveen Paripati, Reston, VA (US)

( * ) Notice: Subject to any disclaimer, the term of this patent is extended or adjusted under 35 U.S.C. 154(b) by 0 days.

(21) Appl. No.: 14/211,159

(22) Filed: Mar. 14, 2014

Related U.S. Application Data (60) Provisional application No. 61/783,525, filed on Mar. 14, 2013.

(51) Int. Cl.
*G08B 23/00* (2006.01)
*A01K 29/00* (2006.01)
*G06T 7/00* (2006.01)

(52) U.S. Cl.
CPC .............. *A01K 29/005* (2013.01); *G06T 7/0004* (2013.01); *G06T 2207/30128* (2013.01)

(58) Field of Classification Search
CPC .................................................... A01K 11/005
USPC ....................................................... 340/573.3
See application file for complete search history.

(56) References Cited

U.S. PATENT DOCUMENTS

| | | | |
|---|---|---|---|
| 3,076,903 A | 2/1963 | Schwartz | |
| 3,899,698 A | 8/1975 | Kleinschmidt | |
| 3,940,637 A | 2/1976 | Ohigashi et al. | |
| 4,158,117 A | 6/1979 | Quilliam et al. | |
| 4,313,510 A | 2/1982 | Tomlinson | |
| 4,339,011 A | 7/1982 | DiMarzio | |
| 4,512,431 A | 4/1985 | Bloomfield | |
| 4,617,876 A * | 10/1986 | Hayes ................. | A01K 1/0023 119/51.02 |
| 4,793,429 A | 12/1988 | Bratton et al. | |
| 5,362,929 A | 11/1994 | Goto | |
| 6,467,977 B2 | 10/2002 | Luque et al. | |
| 6,699,207 B2 * | 3/2004 | Tasch ..................... | A61B 6/50 600/587 |
| 6,824,599 B2 | 11/2004 | Swatloski et al. | |
| 2002/0010390 A1 * | 1/2002 | Guice ................. | A01K 11/008 600/300 |
| 2003/0051925 A1 * | 3/2003 | Ostermann ........... | G01G 17/08 177/145 |
| 2003/0192487 A1 * | 10/2003 | Zimmerman .......... | A01K 29/00 119/842 |
| 2005/0011681 A1 * | 1/2005 | Follonier ................ | G01G 3/12 177/10 |
| 2005/0280561 A1 * | 12/2005 | Face ..................... | H03K 17/965 341/34 |
| 2006/0052980 A1 * | 3/2006 | LaFollette ............. | G01G 19/02 710/173 |
| 2007/0062289 A1 * | 3/2007 | Heyman ............... | G01G 19/022 73/597 |
| 2007/0251294 A1 * | 11/2007 | Tanaka ................ | G01P 15/0922 73/12.01 |
| 2010/0018327 A1 * | 1/2010 | Kogure ................ | A61B 5/1036 73/862.041 |
| 2010/0050947 A1 * | 3/2010 | Kortekaas ............... | A01K 1/12 119/14.02 |
| 2011/0125062 A1 | 5/2011 | Mulder | |
| 2011/0137584 A1 | 6/2011 | Travis | |
| 2012/0007470 A1 | 1/2012 | Kurihara et al. | |
| 2013/0183739 A1 | 7/2013 | Singh et al. | |

FOREIGN PATENT DOCUMENTS

| | | |
|---|---|---|
| WO | WO 2010/012433 | 2/2010 |
| WO | WO 2012/038955 | 3/2012 |

OTHER PUBLICATIONS

Berckermans, *Automatic On-Line Monitoring of Animals by Precision Livestock Farming*, International Society for Animal Hygiene, (2004) pp. 27-30.

(Continued)

*Primary Examiner* — Naomi Small
(74) *Attorney, Agent, or Firm* — Arent Fox LLP (57) ABSTRACT

A method and system for the remote determination of an animal weight, and other animal variables, using a piezoelectric sensor.

11 Claims, 3 Drawing Sheets

(56) References Cited

OTHER PUBLICATIONS

Bushman & Pratt; and Ali, et al., Weigh in Motion Technology-Economics and Performance. Presented at NATMEC '98 by Andrew Pratt, *Canadian Journal of Civil Engineering*(1994) 21(1): 156-160.
Frost, et al., *Computers and Electronics in Agriculture*(1997) 17:139-159.
Integra I-Box 360° information (downloaded from Internet on Mar. 4, 2013) [5 pages].
Jiang, et al. "Improvements in Piezoelectric Sensors and WIM Data Collection Technology."*Innovations in Pavement Monitoring and Evaluation*Session of the 2009 Annual Conference of the Transport Association of Canada, Vancouver, British Columbia (17 pages).
Pater "How Much Does Your Animal Weight?" University of Arizona Cooperative Extension (2007) [2 pages].
International Road Dynamics, Inc. "MSI Class I & Class II Piezo Axle Sensor" (2007) [2 pages].
Ali, et al., Evaluation of piezoelectric weigh-in-motion system. *Canadian Journal of Civil Engineering* (1994) 21(1): 156-160 [Abstract].
Berckermans "Automatic On-Line Monitoring of Animals by Precision Livestock Farming." *International Society for Animal Hygiene*, (2004) pp. 27-30.
Birkholz, "Crystal-field induced dipoles in heteropolar crystals—II. physical significance." *Z. Phys. B* (1995) 96: 333-340.
De Wet, et al., *British Poultry Science* (2003) 44 (4): 524-532 [Abstract].
Eigenberg, et al., *Transactions of the ASAE* (2000) 43 (3): 723-728.
*Gait Assessment of Dairy Cattle* by Frances Claire Flower from The University of British Columbia (Canada) [2006] 123 pages.
Kwon "Signal Processing of Piezoelectric Weight-in-Motion and Systems." *From Proceedings* (573) Circuits, Signals, 2007 [Abstract].
Lacey & Hamrita *Journal of Applied Poultry Research* (2000) 9(1): 6-12.
Laycock & Street, *J. Agric. Eng. Res.* (1984) 30: 265-273 [Abstract].
Maertens, et al, "Acquisition techniques for dairy cow gait analysis." *Precision Livestock Farming* (2007) pp. 133-140 [Abstract].
Marchant, et al., *Applied Animal Behaviour Science* (2001) 72 (1): 23-39 [Abstract].
Onyango, et al., *Computers and Electronics in Agriculture* (1995) 12(4): 261-273 [Abstract].
Persaud & Dodd *Nature* (1982) 299: 352-355 [Abstact].
Schofield, *J. Agric. Eng. Res.* (1990) 47: 287-296 [Abstract].
Shurmer *Proc. Inst. Electrical Engineers-G Circuits Devices Systems* (1990) 137: 197-203 [Abstract].
Stone, et al. *Poultry Sci.* (1984) 63: 616-619 [Abstract].
Turner, et al. (1985) Automatic weight monitoring pigs—Part 1: Trials of prototype weight platforms. Silsoe Research Institute Divisional Note DN/1266, Silsoe Research Institute, Silsoe, Bedford, UK. [Abstract].
Turner, et al., *J. Agric. Eng. Res.* (1984) 29: 17-24 [Abstract].
Velasco-Garcia & Mottram, 434 [Abstract] *Trends in Biotechnology* (2001) 19(11): 433-434 [Abstract].
Weary & Chua, *Applied Animal Behaviour Science* (2000) 69 (3): 177-188 [Abstract].
Zimmerman, et al., *Animal Welfare* (2003) 12 (3): 315-326 [Abstract].

\* cited by examiner

ANIMAL WEIGHT MONITORING SYSTEM

CROSS-REFERENCE TO RELATED PATENT APPLICATIONS

This patent application claims the benefit of U.S. Provisional Patent Application No. 61/783,525, filed on Mar. 14, 2014, the disclosure of which is herein incorporated by reference in its entireties.

FIELD OF THE INVENTION

The invention provides for a method and system for determining the weight of an animal using a piezoelectric sensor.

BACKGROUND OF THE INVENTION

Livestock production today is no longer limited to obtaining economic goals. Modern society is concerned about food safety and quality, efficient and sustainable animal farming, healthy animals, guaranteed animal wellbeing and acceptable environmental impact of livestock production. As a consequence, there is a growing need to monitor many variables during the entire production process in order to satisfy these targets. In the past, livestock management decisions have been based almost entirely on the observation, judgment and experience of the farmer. Frost, et al. (1997) *Computers and Electronics in Agriculture* 17: 139-159. However, the combination of the increasing scale of the farms and the corresponding high number of animals, has resulted in an increasing administrative, technical, organizational and logistic workload for the farmer and increased the difficulty in monitoring the animals. Berckermans (2004) "Automatic On-Line Monitoring of Animals by Precision Livestock Farming." *International Society for Animal Hygiene*, pages 27-30.

Modern, intensive farms make the farmer totally responsible for all livestock under the farmer's control. Over the last three decades farming practice has moved away from self-sustaining mixed livestock enterprises with relatively small numbers of several species, towards large, single species units. Animals now are produced intensively, and maintained under near ideal conditions for growth and production within current technological limits. The majority of animals are constrained within a building or stockyard for most or all of their lives. As they are prevented from foraging for their own food, the farmer takes complete responsibility for all aspects of their husbandry. Monitoring of feeding, environment, reproduction, health, growth, marketing, transport and quality becomes the responsibility of the farmer. This responsibility is not only moral; it is also in the farmer's commercial interest to satisfy these basic needs of their livestock. Frost, et al. (1997) *Computers and Electronics in Agriculture* 17: 139-159.

The main purpose of most livestock production enterprises is to satisfy the demands of a customer by providing a product which meets the customer's requirements at a price which enables the producer to make a profit. The customer's requirements are becoming increasingly well defined. An example is the meat industry which pays producers more for animals of a particular weight, conformation and composition. Another example is the dairy industry which pays dairy farmers according to milk quality and composition.

Sensors can be used to gather an increasingly wide range of information. However with the development of these sensors it becomes more important to develop systems which can collect, process, and utilise the information. Raw data, on its own, is of limited value. The farmer can maximise the efficiency of a production system only by monitoring all its critical stages and targets and ensuring that they are kept close to the optimum. For example, it may be necessary to assimilate data on the climate within and without a building, the breed, number, age, feed level and weight of animals, their growth rate, activity and health records and market requirements.

Animal Weight

The weight of an animal is an important indicator of the wellbeing and value of an animal. However very few livestock producers weigh their animals frequently. This is often due to the lack of convenient weighing equipment. Hog farmers, cattle farmers, and poultry farmers need to pay close attention to the weight of the animal in order to be profitable. Growing hogs or cattle beyond their slaughter weight or market weight dramatically reduces their market value, causing the farmers to lose significant revenue. Most farms have a single weighing scale that is used when it is decided that animals are ready for market, by which time quite a few could be over the weight threshold.

For poultry, an automatic broiler weighing system is described by Turner, et al. (1984) *J. Agric. Eng. Res.* 29: 17-24. This consists of a perch for individual birds, suspended on a strain gauge link. The perch is monitored by a computer which tares the weight between each record, stores and processes each reading to eliminate false data, and provides the farmer with a weight distribution for the flock. An abnormal change in the weight of the birds can provide an early warning of health problems, or of problems with feeding or ventilation equipment. A further enhancement allows the birds in the flock to be split into separate groups according to weight, by automatically directing them to a 'heavy' or a 'light' pen as they leave the weigher. A difficulty with any system that operates on a sample of the population is ensuring that the sample is representative of the population.

Knowledge of the growth rate of pigs provides valuable information on health, productivity and yield. A growth rate curve for example shows up deviations from the ideal, indicating checks in growth which require investigation, or delays in starting growing following weaning. In order to gain enough readings to be able to follow the growth rate of individual pigs, it is necessary to weigh them at least weekly. This is impractical if done conventionally, due to the large labour input it requires, and the stress it causes to man and animal. If pigs were weighed automatically and frequently, each time they attended a feeder for instance, then it would be possible to produce a growth curve, provided that each animal was identified using electronic tags, for example. Load platforms are available for weighing pigs attending feed stations, but have been found to be unreliable due to mechanical interference by the pigs and dirt building up under the platform. Turner, et al. (1985) Automatic weight monitoring pigs—Part 1: Trials of prototype weight platforms. Silsoe Research Institute Divisional Note DN/1266, Silsoe Research Institute, Silsoe, Bedford, UK.

It has been found that there is a strong correlation between the weight of a pig and its plan view area. Schofield (1990) *J. Agric. Eng. Res.* 47: 287-296. This has led to the development of systems in which images from a video camera, suspended over a pig, are analysed to extract the plan view area and estimate the weight of the animal. Schofield & Marchant (1991) *Proc. Int. Soc. Optical Eng.* 1379: 209-219. Pig weights have been determined to within 5% accuracy by this method. Schofield (1993) In: Proceedings of the 4th livestock environment symposium, Warwick, England, ASAE, pages 503-510; Minagawa, et al. (1993) Proc. 4th Livestock Environment Symp., Warwick, England, ASAE, pages 528-535.

This type of system has the advantages of not interfering with the animal or requiring equipment to be installed at pig level where it is vulnerable to attack. It also has no moving parts which should benefit reliability. Disadvantages are that the performance of the system depends on the quality of the images, which can be affected by lighting conditions, and that the relationship between weight and plan view area has to be established for each different breed of pig; it is not yet known how many relationships will be required to cover all breeds of pig that are currently being grown.

An automatic weighing machine for cows has been reported. Filby, et al. (1979) *J. Agric. Eng. Res.* 24: 67-78; Laycock & Street (1984) *J. Agric. Eng. Res.* 30: 265-273. The automatic weighting machine for cows consists of a load cell connected to a platform across which cows walked as they left the milking parlour. One of the main difficulties was that of filtering the highly variable signal that was produced as the cow walked across the platform. It was also necessary to ensure that weights were recorded only when a single cow had all of its weight on the platform, and that spurious readings due to more than one cow at a time being on the platform, or a cow not having all of its feet on the platform, were rejected. In practice it was found that about 80% of a herd of 270 cows could be weighed on exit from a conventional 16 place herringbone parlour, which meant that weekly mean weights for about 90% of the herd could be obtained. The error associated with each weight was found to be greater than that from a manual weighing but it was estimated that the accuracy of a mean weekly weight of an animal measured by such a system was equal to that which would result from three manual weighings per week. This type of device has not been widely adopted, probably because of the technical problems mentioned above, and because the economic justification for weighing dairy cows frequently has not been established to the satisfaction of the farmer. Frost, et al. (1997) *Computers and Electronics in Agriculture* 17: 139-159.

Further, systems for estimating animal weight are described in the art. Mulder describes monitoring the condition of animals which utilizes current height and weight measurements taken from an animal in order to automatically derive a height-to-weight ratio. WO 2010/012433 and U.S. Patent Application Publication No. 2011/0125062. Also an automatic animal feed consumption monitoring system comprising an enclosing having a quantity of feed therein is described by Travis were the sensor detects an animal's entry into a stall and records the entry time, the food weight at the beginning of the feeding and the animal's exit time and food weight at the end of the feeding. U.S. Patent Application No. 2007/0137584. The disadvantage of these systems is that they only approximate the weight and health of the animal but are limited to a single location and may require that the animal be corralled or trained to use the device.

Thus a need exists in the art for an efficient remote method and system for monitoring farm animal weight.

SUMMARY OF THE INVENTION

In one embodiment, a method for determining animal weight may comprise (a) bringing an animal in contact with a piezoelectric sensor; (b) converting the pressure from contact with said animal to generate an electric signal and electricity; (c) sending said electrical signal to a processing unit; (d) determining said animal's weight based on the electrical signal; and (e) collecting at least part of the electricity generated by said piezoelectric sensor.

In one embodiment, an animal may be brought into contact with the piezoelectric sensor by walking the animal through a stall, corridor, stock, or barn. In another embodiment, the stock may be a chute.

In one embodiment, the method may comprise determining the weight of more than one animal.

In one embodiment, the central processing unit may be coupled to a power supply and a data storage means.

In one embodiment, the method may further comprise monitoring the environmental conditions, animal composition, odors, gait analysis, animal behavior, or animal vocalizations.

In one embodiment, the piezoelectric sensor may be coupled to at least one wireless node forming a wireless mesh network and said piezoelectric sensor may be coupled to the wireless transceiver to communicate data over the wireless mesh network. In another embodiment, the antenna may be communicatively coupled to said transceiver. In one embodiment, the wireless router may be coupled to the mesh network. In another embodiment, the wireless router may be a 802.11 router, 802.16 router, WiFi router, WiMAX router, Bluetooth router, or X10 router.

In one embodiment, the piezoelectric sensor may be coupled to a rechargeable battery. In another embodiment, the battery may be a NiMH battery. In another embodiment, the piezoelectric sensor may be coupled to a power supply system.

In one embodiment, a method for monitoring animal weight may comprise calculating the weight of one or more animals on a piezoelectric sheet; wherein if the reported weight is greater than the threshold, a photograph of the location be taken and automatically analyzed to identify if one or more animals are present; and if it is determined that a single animal is present and the animal has reached the threshold weight, a notification be sent to the farm administrator, along with the photograph and any additional identification tags.

In another embodiment, if the animal has not reached the weight threshold, the method updates the weight of the animal to the newly acquired value. In another embodiment, the power generated by the piezoelectric generators may be stored. In another embodiment, if the animal is below a weight threshold, the animal is identified as underweight. In another embodiment, a plurality of piezoelectric sheet may be arranged on the floor.

In one embodiment, a method for monitoring livestock weight may comprise (a) bringing a livestock animal in contact with a piezoelectric sensor; (b) converting the pressure from contact with said animal to generate an electric signal and electricity; (c) sending said electrical signal to a processing unit; (d) determining said livestock animal's weight based on the electrical signal; and (e) collecting at least part of the electricity generated by said piezoelectric sensor.

In another embodiment, the method may further comprise monitoring the environmental conditions, animal composition, odors, gait analysis, animal behavior, or animal vocalizations.

In another embodiment, the piezoelectric sensor may be coupled to at least one wireless node forming a wireless mesh network and said piezoelectric sensor may be coupled to the wireless transceiver to communicate data over the wireless mesh network. In another embodiment, the antenna may be communicatively coupled to said transceiver. In another embodiment, the wireless router coupled to the mesh network. In another embodiment, the piezoelectric sensor may be coupled to a rechargeable battery. In another embodiment, the battery may be a NiMH battery. In another embodiment, the piezoelectric sensor may be coupled to a power supply system and provides electricity to said power supply.

In one embodiment, the method may further comprise monitoring the environmental conditions, animal composition, odors, gait analysis, animal behavior, or animal vocalizations.

In one embodiment, the method may further comprise determining if said livestock animal is above a target weight. In another embodiment, the method may further comprise identifying said livestock animal if said animal is above a target weight. In another embodiment, the method may further comprise sending an alert to the farm administrator for harvesting the animal.

In one embodiment, the method may further comprise tagging said animal if said animal is above a target weight. In another embodiment, the tagging may comprise attaching an ear tag, tattooing animal, painting animal, ear notching animal, or activating an electronic tag. In another embodiment, the electronic tag may be an radio frequency (RFID) tag, microchip tag, or wireless tag.

In one embodiment, the method may further comprise identifying said livestock animal if said animal is below a target weight. In another embodiment, the method may further comprise sending an alert to the farm administrator for attention for the animal.

In one embodiment, the animal may be brought into contact with the piezoelectric sensor by walking the animal through a stall, corridor, stock, or barn. In a further embodiment, the stock may be a chute.

In a further embodiment, the method may comprise determining the weight of more than one animal.

In one embodiment, the method may further comprise determining if said animal is above a target weight. In another embodiment, the method may further comprise identifying said animal if said animal is above a target weight. In another embodiment, the method may further comprise tagging said animal if said animal is above a target weight.

In one embodiment, the tagging may comprise attaching an ear tag, tattooing animal, painting animal, ear notching animal, or activating an electronic tag. In another embodiment, the electronic tag may be an radio frequency (RFID) tag, microchip tag, or wireless tag.

In one embodiment, a weigh-in-motion (WIM) system for determining an animal's weight may comprise a piezoelectric sheet coupled to a wireless system.

In one embodiment, a remote animal weight monitoring system may comprise a piezoelectric sheet coupled to a wireless system, central processing system, a power supply, and a camera, wherein said piezoelectric sheet converts the pressure from contact to generate an electric signal and electricity, wherein said wireless system comprises a transceiver communicatively coupled to an antenna, a receiver, and a power supply, and wherein said a central processing unit coupled to a data processing means, a power supply, and a display. In another embodiment, the piezoelectric sheet may comprise a piezoelectric sensor. In another embodiment, the piezoelectric sheet may send an electrical signal via said wireless system to said central processing unit. In another embodiment, the central processing unit may determine an animal's weight based on an electrical signal set from a piezoelectric sheet. In one embodiment, the system may further comprise means for monitoring the environmental conditions, animal composition, odors, gait analysis, animal behavior, or animal vocalizations.

In one embodiment, the animal may be a mammal. In another embodiment, the mammal may be an alpaca, banteng, bison, camel, cow, deer, donkey, gayal, goat, guinea pig, horse, llama, mule, pig, rabbit, reindeer, sheep, water buffalo, or yak.

In one embodiment, the animal may be a bird. In another embodiment, the bird may be chicken, duck, emu, goose, India peafowl, mute swan, ostrich, pigeon, turkey, Guinea fowl, Common Pheasant, Golden Pheasant, or rhea.

In one embodiment, at least part of the electricity generated by said piezoelectric sheet may be collected. In another embodiment, the electricity may be stored. In another embodiment, the electricity may be stored in a battery. In another embodiment, the power supply may be a battery. In another embodiment, the battery a rechargeable battery. In another embodiment, the battery may be a NiMH battery. In a further embodiment, the electricity may be used to power the piezoelectric sheet. In a further embodiment, the electricity may be used to power the piezoelectric sensor.

In one embodiment, the piezoelectric sensor may be piezo-ceramic, piezo-polymer, or piezo-quartz sensor, piezoelectric pressure sensor. In another embodiment, the piezo-ceramic may be barum titanate ($BaTiO_3$), lead tianate ($PbTiO_3$), lead zirconate titanate, potassium niobate ($KNbO_3$), lithium niobate ($LiNbO_3$), lithium tantalate ($LiTaO_3$), sodium tungstate ($Na_2WO_3$), zinc oxide ($ZnO$), $Ba_2NaNb_5O_5$, $Pb_2KNb_5O_{15}$, sodium potassium niobate (($K,Na$)$NbO_3$), bismuth ferrite ($BiFeO_3$), sodium niobate ($NaNbO_3$), bismuth titanate ($Bi_4Ti_3O_{12}$), or sodium bismuth titanate ($Na_{0.5}Bi_{0.5}TiO_3$). In another embodiment, the piezo-polymer may be polyvinylidene fluoride (PVDF).

In one embodiment, the processing unit may be a computer, central processing unit, microcontroller, or a handheld device. In another embodiment, the processing unit may be a computer, central processing unit, microcontroller, or a handheld device. In another embodiment, the computer may be a laptop, desktop, or mainframe. In another embodiment, the handheld device may be a smartphone.

In one embodiment, the piezoelectric sensor may be in an aviary, barn, brooder, cage, coop, corral, corridor, cowshed, dairy, feeding station, milking parlor, perch, piggery, pigpen, stable, stabling, stall, stock, stockyard, or sty. In another embodiment, the stock may be a chute.

In one embodiment, the piezoelectric sheet may be in an aviary, barn, brooder, cage, coop, corral, corridor, cowshed, dairy, feeding station, milking parlor, perch, piggery, pigpen, stable, stabling, stall, stock, stockyard, or sty. In another embodiment, the stock may be a chute.

BRIEF DESCRIPTION OF THE DRAWINGS

FIG. 1 depicts a flowchart for one embodiment of the invention. The animal may be brought into contact with a piezoelectric sensor (e.g., piezoelectric force transducer). The piezoelectric sensor produces energy which may be collected. The information collected from the piezoelectric sensor may coupled to a central processing unit comprising a power supply and a data storage means where the animal's weight may be determined. If the animal's weight is above a target weight, an alert is sent and the animal is identified (e.g., tagged or activation of the electronic tag, e.g., a radio-frequency identification tag (RFID), wireless tag, or other electronic tag).

FIG. 2 depicts a flowchart for one embodiment of the invention. The animal may be brought into contact with a piezoelectric sensor (e.g., piezoelectric force transducer.) The piezoelectric sensor produces electricity which may be collected. Other metrics of the animal may be collected (e.g., activity, behavior, drinking and feeding behavior, feed intake, sound production, physiological metrics (e.g., body temperature, respiration frequency, blood metrics).) The piezoelectric sensor and the other sensors may coupled to a central processing unit comprising a power supply and a data storage means where the animal's weight may be determined and other metrics stored. If the animal's weight is above a target weight, an alert is sent and the animal is identified (e.g., tagged or activation of the electronic tag, e.g., radio-frequency identification tag (RFID), wireless, or other electronic tag) for harvesting. If the animal's weight is below a target weight, an alert is sent and the animal is identified (e.g., tagged or activation of the electronic tag, e.g., an RFID, wireless, or other electronic tag) for further attention.

FIG. 3 depicts an exemplary configuration of a system described herein. The animal (e.g., a cow), comes into contact with a piezoelectric sensor (e.g., a piezoeletric force transducer), that sends a signal to a receiver. Also the animal may were a tag (e.g., a wireless tag) that sends information to the receiver. The receiver may be coupled to a central processing unit comprising a power supply and data storage means. The information received from the piezoelectric sensor may be computed to determine the animal weight. The processing system may send alerts concerning the animal's weight.

DETAILED DESCRIPTION OF THE PREFERRED EMBODIMENTS

Figure 1:
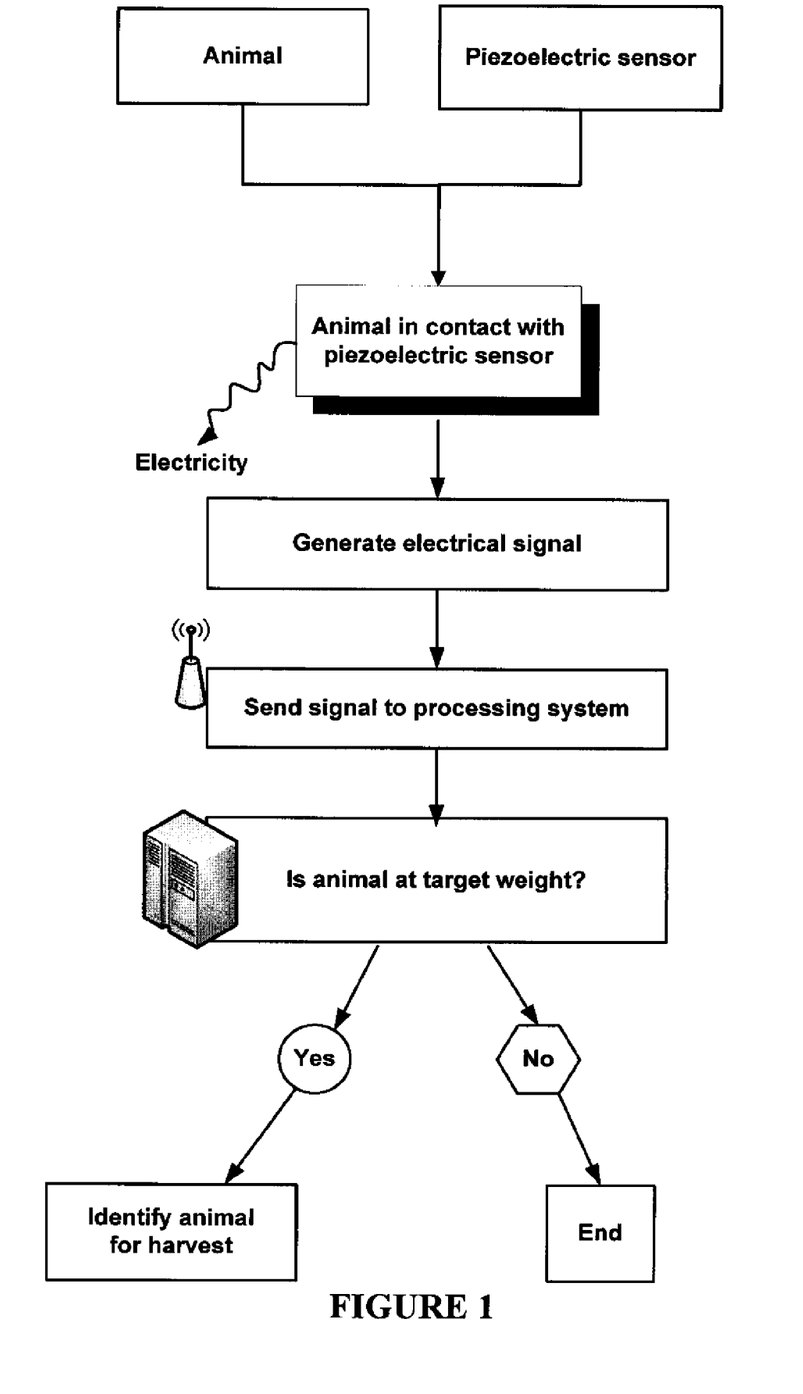
Figure 2:
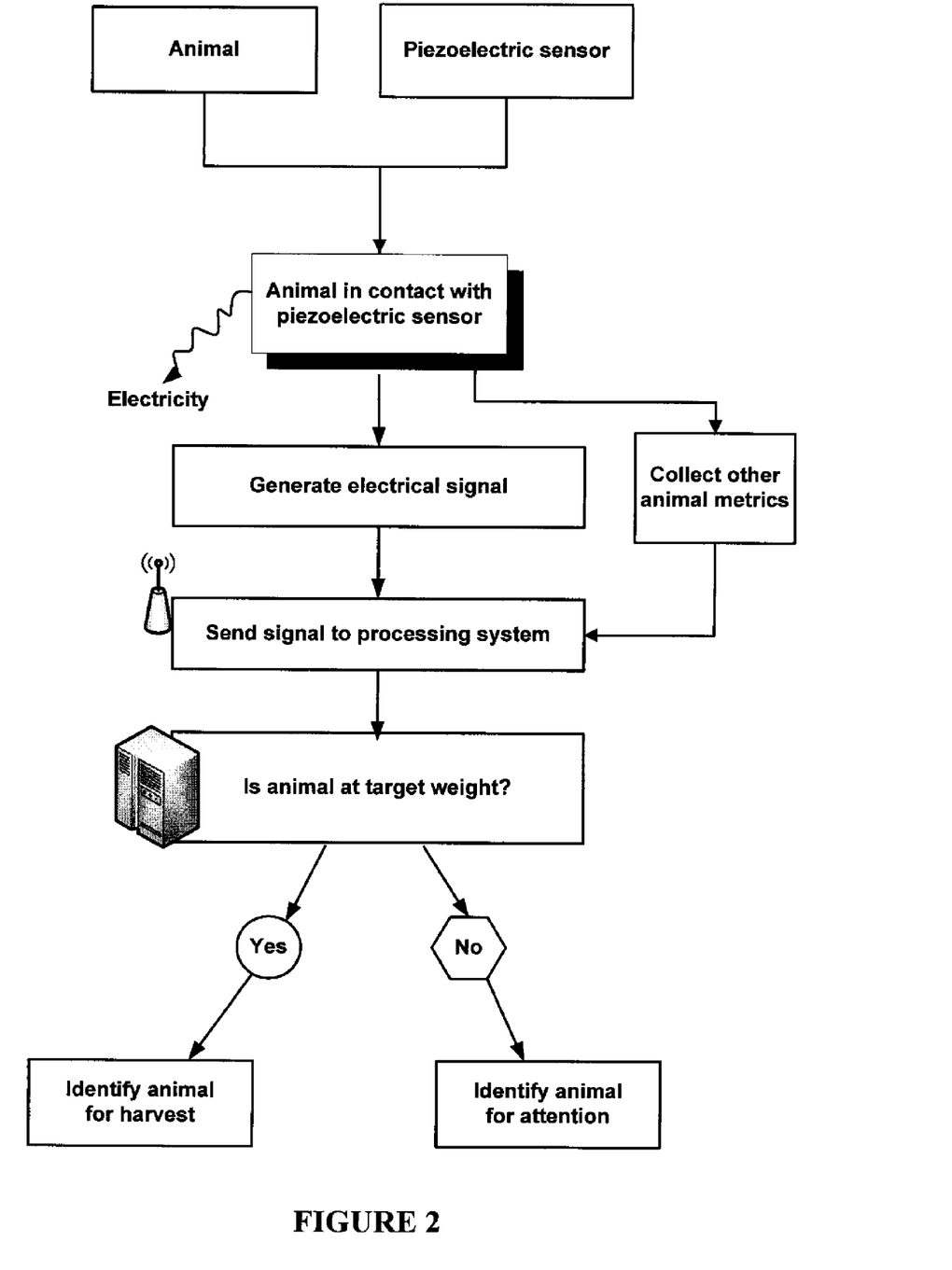
Figure 3:
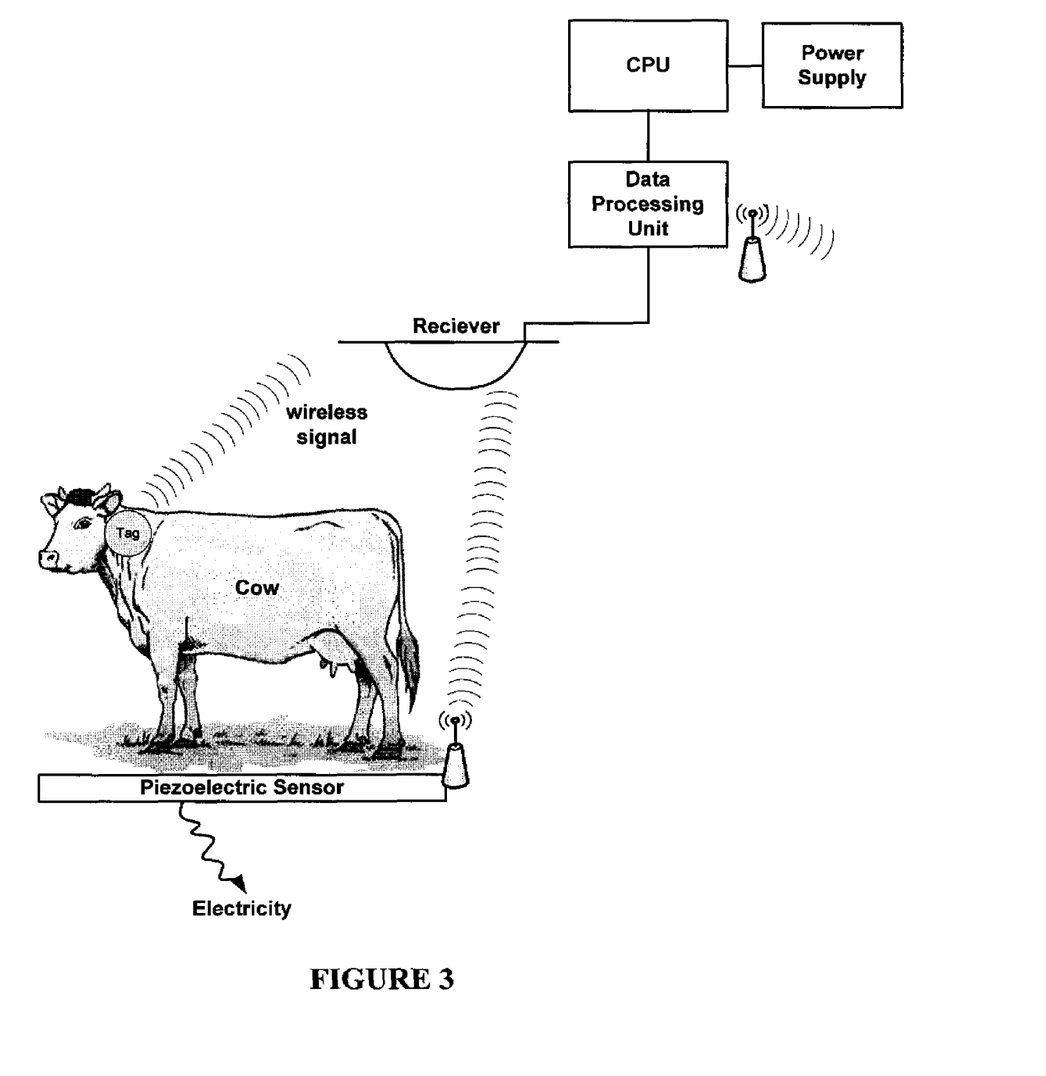

In order that the invention herein described may be fully understood, the following detailed description is set forth. Various embodiments of the invention are described in detail and may be further illustrated by the provided examples. Additional viable variations of the embodiments can easily be envisioned.

DEFINITIONS

Unless defined otherwise, all technical and scientific terms used herein have the same meaning as those commonly understood by one of ordinary skill in the art to which this invention belongs.

As used in the description herein and throughout the claims that follow, the meaning of "a," "an," and "the" includes plural reference unless the context clearly dictates otherwise.

Although certain manufacturers, model names and numbers are given for machinery used in the invention, other machinery may be substituted, as would be appreciated by those skilled in the art.

"Animal variables," as used herein, refer broadly to weight, activity, behavior, drinking and feeding behavior, feed intake, sound production, physiological variables (e.g., body temperature, respiration frequency, blood).

"Livestock," as used herein, refers broadly to a category of domesticated animals raised in an agricultural setting to produce commodities such as food, fiber and labor. Livestock includes but is not limited to alpacas, bantengs, bison, camels, cattle, deer, donkeys, gayals, goats, guinea pigs, horses, llamas, mules, pigs, rabbits, reindeer, sheep, water buffalos, and yaks.

"Mammal," as used herein, refers broadly to any and all warm-blooded vertebrate animals of the class Mammalia, including humans, characterized by a covering of hair on the skin and, in the female, milk-producing mammary glands for nourishing the young. Examples of mammals include but are not limited to alpacas, armadillos, capybaras, cats, camels, chimpanzees, chinchillas, cattle, dogs, elephants, goats, gorillas, hamsters, horses, humans, lemurs, llamas, mice, non-human primates, pigs, rats, sheep, shrews, squirrels, tapirs, and voles. Mammals include but are not limited to bovine, canine, equine, feline, murine, ovine, porcine, primate, and rodent species. Mammal also includes any and all those listed on the Mammal Species of the World maintained by the National Museum of Natural History, Smithsonian Institution in Washington D.C.

"Piezoelectric sensor," as used herein, refers broadly to a device that uses the piezoelectric effect to measure pressure, acceleration, strain or force by converting them to an electrical charge.

"Poultry," as used herein, refers broadly to a category of domesticated birds kept by humans for the purpose of collecting their eggs, or killing for their meat and/or feathers. Poultry includes but is not limited to chickens, ducks, emus, geese, India peafowl, mute swans, ostriches, pigeons, turkeys, Guinea fowl, Common Pheasant, Golden Pheasant, and Rhea.

"Target weight," as used herein, refers broadly to a weight of an animal where the animal is ready for harvest or sending to market. The target weight is set by the farmer (including market conditions) and is generally known in the art for any given livestock animal.

Piezoelectric Sensors for Monitoring Animal Weight

The present invention relates to the development of a system to help monitor animal weight and notify the farmers in case of animals reaching their upper weight thresholds or if they are grossly underweight.

The invention consists of the use of piezoelectric generator sheets on the farm floor, optionally tagging the animal with an identifier (e.g., RFID, wireless tag, or bar code), and optionally a camera system capable of taking photographs of specified regions of the farm lot. Piezoelectric generators are transducers that convert mechanical energy into electrical energy. PZT (lead zirconate titanate) is currently the most efficient energy harvesting device, with about 80% energy conversion efficiency.

The mechanical energy is provided by vehicles on a roadway, trains on a track, or humans along a footpath. Piezoelectric generators have typically been used to produce green energy. In the present invention, the generators may be used to generate electrical energy as well as track the weight of the animal and optionally help identify the animal. The size of the sheets and their maximum performance characteristics are chosen based on the animals being grown and their target size and weight.

A system for monitoring animal weight may comprise (a) calculate the weight of one or more animals on each of the piezoelectric sheets on the floor (b) If the reported weight is greater than the threshold, a photograph of the location be taken and automatically analyzed to identify if one or more animals are present (c) if it is determined that a single animal is present and the animal has reached the threshold weight, a notification be sent to the farm administrator, along with the photograph and any additional identification tags. If the animal has not reached the weight threshold, the system would update the weight of the animal to the newly acquired value. The power generated by the piezoelectric generators can be used as backup power for the farms. This system can also be used to identify animals that are underweight and have special attention paid to them.

Piezoelectric sensors are used to convert mechanical movements, such as force, acceleration or pressure, into electric signals. Piezoelectric sensors for measuring weight are known in the art. See, e.g., U.S. Pat. Nos. 3,076,903; 3,899, 698; 3,940,637; 4,158,117; 4,313,510; 4,339,011; and 4,512, 431; "Weigh in Motion Technology-Economics and Performance." Presented at NATMEC '98 by Andrew Pratt, written by Bushman & Pratt; and Ali, et al. (1994) *Canadian Journal of Civil Engineering* 21(1): 156-160. See also International Road Dynamics, Inc. of Saskatoon, Canada.

The nature of the piezoelectric effect is closely related to the occurrence of electric dipole moments in solids. The latter may either be induced for ions on crystal lattice sites with asymmetric charge surroundings (e.g., $BaTiO_3$ and Lead zirconate titanate) or may directly be carried by molecular groups (as in cane sugar). The dipole density or polarization (dimensionality $[Cm/m^3]$) may easily be calculated for crystals by summing up the dipole moments per volume of the crystallographic unit cell. Birkholz (1995) "Crystal-field induced dipoles in heteropolar crystals—II. physical significance." Z. Phys. B 96 (3): 333-340. As every dipole is a vector, the dipole density P is a vector field. Dipoles near each other tend to be aligned in regions called Weiss domains. The domains are usually randomly oriented, but can be aligned using the process of poling (not the same as magnetic poling), a process by which a strong electric field is applied across the material, usually at elevated temperatures. Not all piezoelectric materials can be poled. Trolier-McKinstry (2008) "Chapter 3: Crystal Chemistry of Piezoelectric Materials." In A. Safari, E. K. Akdogan. Piezoelectric and Acoustic Materials for Transducer Applications. New York: Springer.

Of importance for the piezoelectric effect is the change of polarization P when applying a mechanical stress. This might either be caused by a re-configuration of the dipole-inducing surrounding or by re-orientation of molecular dipole moments under the influence of the external stress. Piezoelectricity may then manifest in a variation of the polarization strength, its direction or both, with the details depending on the orientation of P within the crystal, crystal symmetry and the applied mechanical stress. The change in P appears as a variation of surface charge density upon the crystal faces, i.e. as a variation of the electrical field extending between the faces, since the units of surface charge density and polarization are the same, $[C/m^2]=[Cm/m^3]$. However, piezoelectricity is not caused by a change in charge density on the surface, but by dipole density in the bulk. For example, a 1 $cm^3$ cube of quartz with 2 kN (500 lbf) of correctly applied force can produce a voltage of 12500 V. Sensor Sense: Piezoelectric Force Sensors. Machinedesign.com (2008 Feb. 7).

Piezoelectric materials also show the opposite effect, called converse piezoelectric effect, where the application of an electrical field creates mechanical deformation in the crystal.

The piezoelectric sensor may measure the weight of the animal when in contact with the piezoelectric sensor. Piezoelectric weight sensors are described in U.S. Pat. Nos. 5,362,929 and 6,467,977. Piezoelectric weight-in-motion systems are discussed by Ali, et al. (1994) "Evaluation of piezoelectric weigh-in-motion system." *Canadian Journal of Civil Engineering* 21(1): 156-160; WO 2012/038955; and Kwon (2007) Proceeding CSS '07 Proceedings of the Fifth IASTED International Conference on Circuits, Signals and Systems, pages 233-238.

The piezoelectric sensors may be used to determine an animal's weight if they walk over the piezoelectric sensor. This has the advantage of not requiring the animal to be corralled or trained to stand still on a weighing device.

The piezoelectric sheets may be placed in a stall, a feeding station, a corridor, a shunt for corralling animals, stock, optionally a chute, or barn. The piezoelectric sheets may be arranged in a pattern throughout an animal housing (e.g., hog hotel, feed lot, barn). The piezoelectric sheet may be located at a feeding station or trough.

The system for monitoring of an animal may further comprise thermal detectors, body scan means, acoustic sensors, and cameras.

The animal may be identified by microchip implanted or worn by the animal, an RFID tag implanted or worn by the animal, painted including with UV paint The weight sensing apparatus may be a piezoelectric film. For example, a polymeric piezoelectric film as described in U.S. Pat. No. 4,512,431. U.S. Pat. No. 4,793,429 describes a dynamic vehicle-weighing system for vehicles in motion. Materials similar to those described in U.S. Pat. No. 4,793,429 for constructing a weighing apparatus.

A sensor network including networked sensor nodes which are small integrated units of a sensor, a wireless apparatus, and a data processing function. The sensor nodes may be battery-less and capable of generating electric power on their own. Thus, an ultra-small sized system for micro-power generation utilizes the in-situ environment, such as a solar battery system, a thermoelectric generation system, or a vibrating power generation system. U.S. Patent Application No. 2012/0007470.

As a type of micro-power generation technology, micro-piezoelectric power generation that utilizes a piezoelectric phenomenon is known. Micro-piezoelectric power generation is a system for converting mechanical force, such as vibrations or shocks, into electric energy. The micro-piezoelectric power generation technology may be widely applied for various applications including human bodies, living organisms, and other moving objects, in addition to cars and machines. U.S. Patent Application No. 2012/0007470.

Sensors and Sensing Techniques for Measuring Animal Variables

Additional sensors, sensing techniques, and cameras may be used in conjunction with the piezoelectric sensor to monitor the animal variables.

Sensors and sensing techniques to acquire on-line information from animals and to collect different animal variables. For cows, pigs and chicken several sensors, sensing principles and sensing techniques are known in the art. Sensors are known for measuring eating behavior, respiration rate, non destructive chewing behavior, and stress responses for pigs. See, e.g., Eigenberg, et al. (2000) *Transactions of the ASAE* 43 (3): 723-728. For cows, sensors are known to measure deep body temperature, body weight, udder health, oestrus, breath emissions, biting rate in grazing cows and others. Velasco-Garcia & Mottram (2001) *Trends in Biotechnology* 19 (11): 433-434. For chickens sensors are known to measure body temperature with radio transmitters, biosensors to detect pathogenic bacteria at very low levels, heat stress and others. Lacey, et al. (2000) *Journal of Applied Poultry Research* 9 (1): 6-12. Vocalisations of pigs may be measured to determine if the pigs need for supplemental heat, peripheral endocrine stress responses, behavioral responses to separation, on-line detection of infection of the respiration system. Marchant, et al. (2001) *Applied Animal Behaviour Science* 72 (1): 23-39; Berckermans (2004) "Automatic On-Line Monitoring of Animals by Precision Livestock Farming." *International Society for Animal Hygiene*, pages 27-30.

The vocalization of cow sounds to may be used to measure an animal's condition, effects of separation on behavioral responses, milk production, and identification of individual cows. Weary & Chua (2000) *Applied Animal Behaviour Science* 69 (3): 177-188. The vocalization of chicken may be used to determine an increasing number of gakel-calls with an increasing hunger state, stress dependence of chicks call qualities, capacity to emit food calls and quantification of stress. Zimmerman, et al. (2003) *Animal Welfare* 12 (3): 315-

326. Sensors, optionally cameras, may be used for image analysis of pigs to measure: location of pigs in scenes, stress conditions, tracking of piglets, relation of outside 3 dimensional body conformation and lean-fat ratio, on-line monitoring of pig weight. Onyango, et al. (1995) *Computers and Electronics in Agriculture* 12 (4): 261-273. Sensors, optionally cameras, may be used for image analysis of chicken for real time disease detection, behavioral responses, non-destructive prediction for yolk-albumen ratio in chicken eggs, feeding behavior, animal distribution and activity and automatic identification of activities related to animal welfare, animal weight. De Wet, et al. (2003) *British Poultry Science* 44 (4): 524-532.

An integrated monitoring system is one which collects information from a variety of sources, including sensors, databases and knowledge bases, processes the data, and provides outputs, which may be recommendations to the producer, or direct process control actions. Inputs to the system would include sensors measuring for example climatic conditions, feed intake, growth rate, animal behaviour and product quality; databases containing past values of these variables; and models to enable future conditions to be predicted, or the values of unmeasurable variables to be deduced. The interpretation routines would use this information to draw conclusions relating to the progress of the production process in areas such as climate and feed control, and the health and reproductive status of the animals. In the final stage a knowledge base would initiate control actions, or report to the user, with recommendations for actions.

For example, in the case of a pig fattening house, the system may monitor: sound, indicating illness (coughing), fighting or fright amongst the stock, power failure or mechanical breakdown of ventilation equipment; odour and air quality, e.g., high ammonia emissions or the smell of smoke or overheating electrical equipment; appearance including animal numbers, condition, location, signs of injury (e.g., lameness, fighting, wounds, prolapses), signs of ill health (e.g., stance, unusual behaviour), and inputs such as heating and ventilation rates, and feed and water consumption.

The advantages of integrated monitoring systems described herein include: continuous, non-intrusive operation; a very large memory capacity; the ability to detect small but significant changes and complex patterns in data, which may pass unrecognised by the farmer; objective assessments are possible; the ability to integrate data from various sources (e.g., sensors, knowledge bases and databases) so that conclusions can be drawn which would not be apparent from the data from a single source.

Several computer based systems, containing some of the elements of an integrated monitoring system, have been developed for pig production. The system examines quarterly data from farms, relating to variables such as size of litter, mortality and feed rates and looks for deviations between actual performance and that which would be predicted from historical data for that farm. Performance is also compared with that of other similar farms. Deviations from expected performance are examined for statistical and economic significance. The expert systems, relating to nutrition, health, reproduction, housing, stock movement and prices, are then used to examine the deviations in performance, find causes and suggest solutions. Such a system would be a valuable management and planning tool. However it is not intended to monitor and control rapidly changing variables such as environmental conditions.

Animal Behaviour

The behaviour of an animal can be a clear indicator of its physiological state. For example a diseased animal may be more, or less, active than a healthy one; animals suffering from a cold environment may huddle together for warmth; an animal's activity level may be linked to its stage in the reproductive cycle. The behaviour of an animal may be monitoring by sensor, sensing techniques, and/or cameras in conjunction with the piezoelectric sensor to collect data on the animal.

Environmental Factors

Livestock housing in temperate climates falls into two types, controlled environment and climatic buildings in which the physical environment mirrors that outdoors. This distinction is based on the desirability of control or modification of the physical environment. In general, the former type is suitable for pigs and poultry while the latter suits ruminants and horses. Manipulation within controlled environment buildings generally involves dry bulb air temperature via variation of ventilation rate. Typically air temperature is measured with thermistors, compared against a set target, and the rate of (mechanical) ventilation is adjusted to raise or lower ventilation heat losses and thereby cool or warm the building. Randall, J. M. and Boon, C. R. (1994) In: C. M. Wathes and D. R. Charles (Editors), *Livestock Housing*. CAB, Wallingford. The environmental conditions may be monitoring by sensor, sensing techniques, and/or cameras in conjunction with the piezoelectric sensor to collect data on the conditions where the animal is housed.

Body Conformation and Composition

The value and condition of a meat animal depends on the conformation and composition of its body. These may be assessed during growth and prior to slaughter, so that ideally sized animals can be produced as economically as possible and marketed at the quality required to achieve the highest slaughter grade.

The composition of the live animal, in terms particularly of fat levels, is also commonly assessed subjectively by the farmer, by eye and by palpation, but ultrasonic devices are available. There are three basic devices for ultrasonic measurement: the probe, the scanner and the velocity of sound (VOS) device. The probe is usually a cylindrical device, about 20 mm diameter and 50 mm long, which is held in contact surface with the animal, and produces a graphical representation of the positions of the fat layers beneath the probe. The body conformation and composition of the animal may be monitoring by sensor, sensing techniques, and/or cameras in conjunction with the piezoelectric sensor to collect data on the animal.

Electronic Odour Sensing

The development of electronic odour sensors (electronic noses) took the mammalian olfactory system as its model. Persaud & Dodd (1982) *Nature* 299: 352-355; Shurmer (1990) *Proc. Inst. Electrical Engineers-G Circuits Devices Systems* 137: 197-203. Neurones respond to a wide range of chemicals and it is the pattern of response of the whole array which gives discrimination between different odours. An electronic nose has an array of non-specific sensors linked to a computer-based pattern recognition system.

A large number of sensors with different operating principles for detecting odorous compounds are known in the art. Persaud & Travers (1991) *Intelligent Instruments Comput.* 147-153. The original devices were of the tin oxide type. These operate by passing an electrical current along a layer of tin oxide heated to 350° C. The hot surface oxidises the odorous compounds, and in doing so draws electrons from the conducting lower layers of tin oxide thereby altering the resistance in the circuit. With suitable interface circuitry tin-oxide sensors have a linear voltage output relative to the concentration of odorous material.

Conducting polymers for odour sensing are a more recent development. They respond to an odour by the diffusion of molecules of the odour compound through the surface. The odours in the animal housing area may be monitoring by sensor, sensing techniques, and/or cameras in conjunction with the piezoelectric sensor to collect data on the animal.

Acoustic Monitoring

The farmer extracts much useful information from the sounds in a livestock house. The vocalisations of animals can be particularly helpful and there have been some attempts to analyse these. For example it has been shown that there is a relationship between physical activity and vocalisation for hens. Stone, et al. (1984) *Poultry Sci.* 63: 616-619. Examples of vocalisation of pigs describing fear, isolation, pain, greetings, anticipation and frustration have been demonstrated by Wood-Gush, D. G. M. (1983) The Edinburgh School of Agriculture, University of Edinburgh, Chapman and Hall, New York. Riley (1972) *Tierpsychol* 31: 171 developed a series of sonographs for 15 different calls for adult pigs. From these sonographs, differences in the acoustical properties of different calls were observed. The animal sounds may be monitoring by sensor, sensing techniques, and/or cameras in conjunction with the piezoelectric sensor to collect data on the animal.

Gait Analysis

The animal's gait may be evaluated by the pattern of pressure on a piezoelectric sensor. The gait may be used as an animal variable to determine the health of an animal (e.g., horse). *Gait Assessment of Dairy Cattle* University of British Columbia (Canada) [2006], 123 pages; Maertens, et al. "Acquisition techniques for dairy cow gait analysis." (2007) Precision Livestock Farming '07, pages 133-140.

All publications (e.g., Non-Patent Literature), patents, patent application publications, and patent applications mentioned in this specification are indicative of the level of skill of those skilled in the art to which this invention pertains. All such publications (e.g., Non-Patent Literature), patents, patent application publications, and patent applications are herein incorporated by reference to the same extent as if each individual publication, patent, patent application publication, or patent application was specifically and individually indicated to be incorporated by reference.

Although methods and materials similar or equivalent to those described herein may be used in the invention or testing of the present invention, suitable methods and materials are described herein. The materials, methods and examples are illustrative only, and are not intended to be limiting.

The invention now being generally described, it will be more readily understood by reference to the following examples, which are included merely for purposes of illustration of certain aspects and embodiments of the present invention, and are not intended to limit the invention.

EXAMPLES

Example 1

Monitoring Health of Dairy Cows

Piezoelectric sensors are installed in a dairy farm operation in a corridor connecting a milking parlor to an outside door. As the dairy cows are led to the milking parlor they come into contact with the piezoelectric sensor which converts the pressure from contact with the dairy cows to generate an electric signal and electricity. The piezoelectric sensor sends the electrical signal to a smart phone which alerts the farm administrator to any milking cows under a target weight. The wireless tags on these underweight animals are then activated for attention by the farm administrator.

Example 2

Monitoring Health of Beef Cattle

Piezoelectric sensors are installed in a high-density feed lot in mats near the feeding trough. As the beef cattle approach the feeding trough, they come into contact with the piezoelectric sensor which converts the pressure from contact with the beef cattle to generate an electric signal and electricity. The piezoelectric sensor sends the electrical signal to a smart phone which alerts the farm administrator to any beef cattle are above a target weight. The wireless tags on these market weight animals are then activated for harvesting by the farm administrator. If the beef cattle is under a target weight expected for the beef cattle at that age, the wireless tags on these underweight animals are then activated for attention by the farm administrator.

Those skilled in the art will recognize, or be able to ascertain using no more than routine experimentation, many equivalents to the specific embodiments of the invention described herein. Such equivalents are intended to be encompassed by the following claims.

I claim:

1. A method for monitoring animal weight comprising calculating the weight of one or more animals on a piezoelectric sheet;
   wherein if the reported weight is greater or lesser than a weight threshold, a photograph of the location is taken and automatically analyzed to identify if one or more animals are present; and
   if it is determined that a single animal is present and the animal has reached a weight threshold weight, a notification is sent to a farm administrator, along with the photograph and any additional identification tags.

2. The method of claim 1, wherein if the animal has not reached the weight threshold, the method updates the weight of the animal to the newly acquired value.

3. The method of claim 1, wherein the power generated by the piezoelectric generators is stored.

4. The method of claim 1, wherein if the animal is below a weight threshold, the animal is identified as underweight.

5. The method of claim 1, wherein a plurality of piezoelectric sheet are arranged on the floor.

6. The method of claim 1, wherein said method further comprises monitoring the environmental conditions, animal composition, odors, gait analysis, animal behavior, or animal vocalizations.

7. The method of claim 1, wherein said animal is a mammal.

8. The method of claim 7, wherein said mammal is an alpaca, banteng, bison, camel, cow, deer, donkey, gayal, goat, guinea pig, horse, llama, mule, pig, rabbit, reindeer, sheep, water buffalo, or yak.

9. The method of claim 1, wherein said animal is a bird.

10. The method of claim 9, wherein said bird is chicken, duck, emu, goose, India peafowl, mute swan, ostrich, pigeon, turkey, Guinea fowl, Common Pheasant, Golden Pheasant, or rhea.

11. A method for monitoring animal weight comprising calculating the weight of one or more animals on a piezoelectric sheet;

wherein if the reported weight is greater or lesser than a weight threshold, an image of the location is taken and automatically analyzed to identify if one or more animals are present; and if it is determined that a single animal is present and the animal has reached a weight threshold weight, a notification is sent to an administrator, along with the image and any additional identification tags.

* * * * *